June 3, 1941. F. AMIOT 2,244,594
DIRECT AIR COOLED ENGINE
Filed Jan. 31, 1939 3 Sheets-Sheet 3
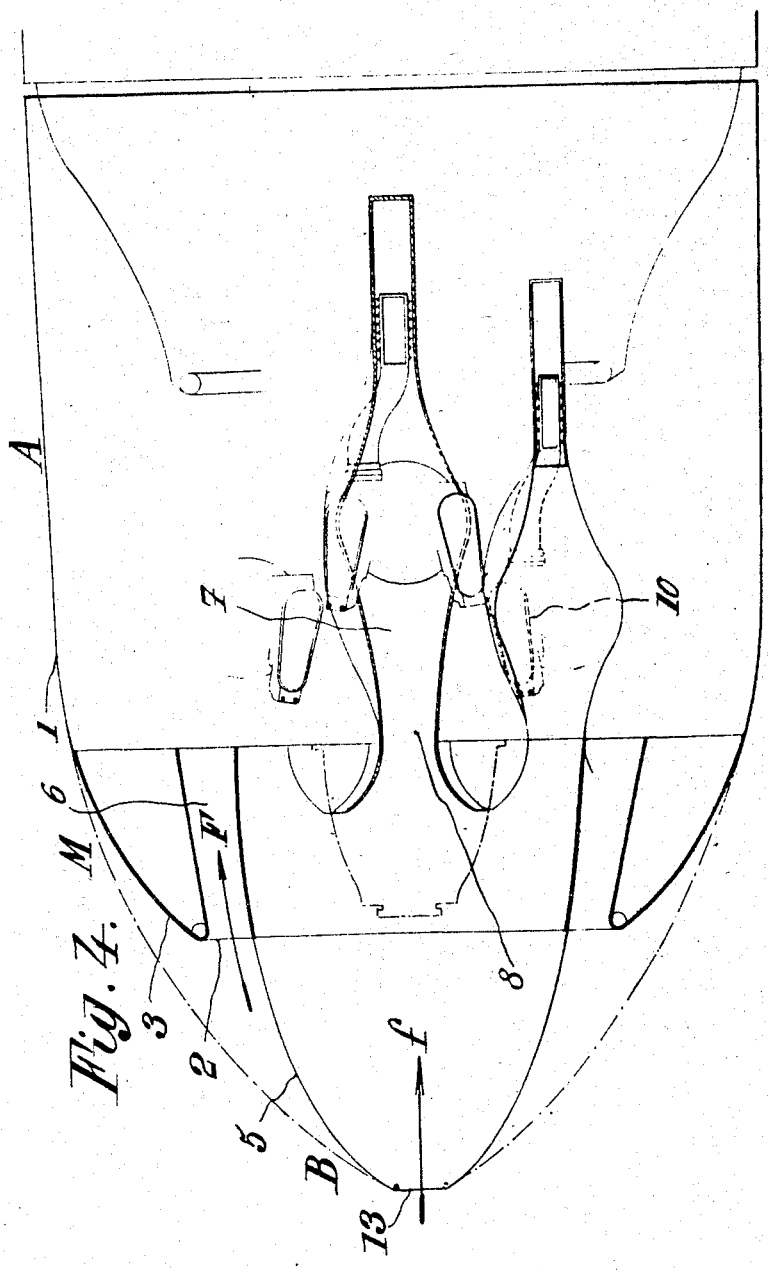
INVENTOR:
FÉLIX AMIOT,
ATTORNEYS Patented June 3, 1941

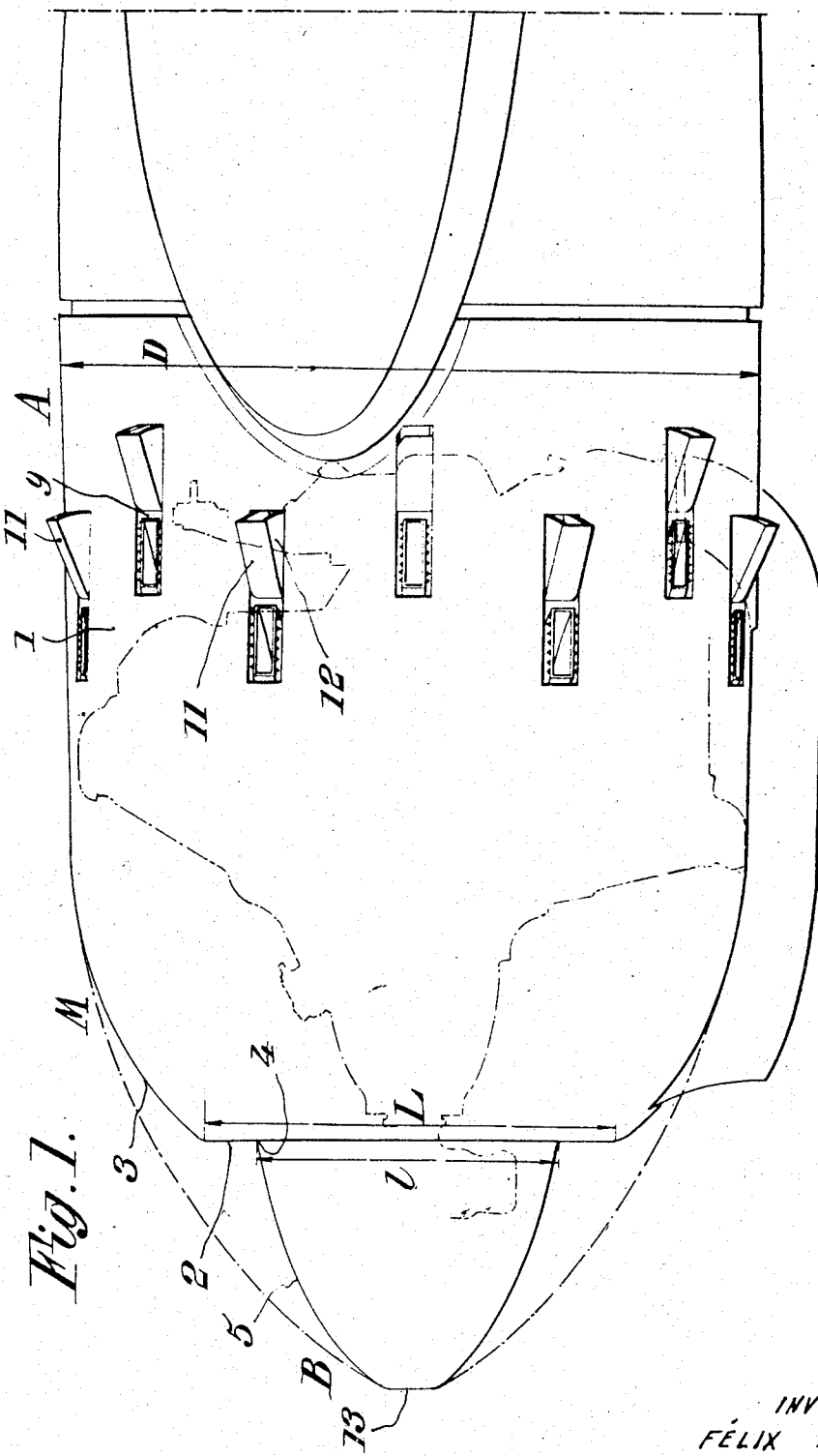

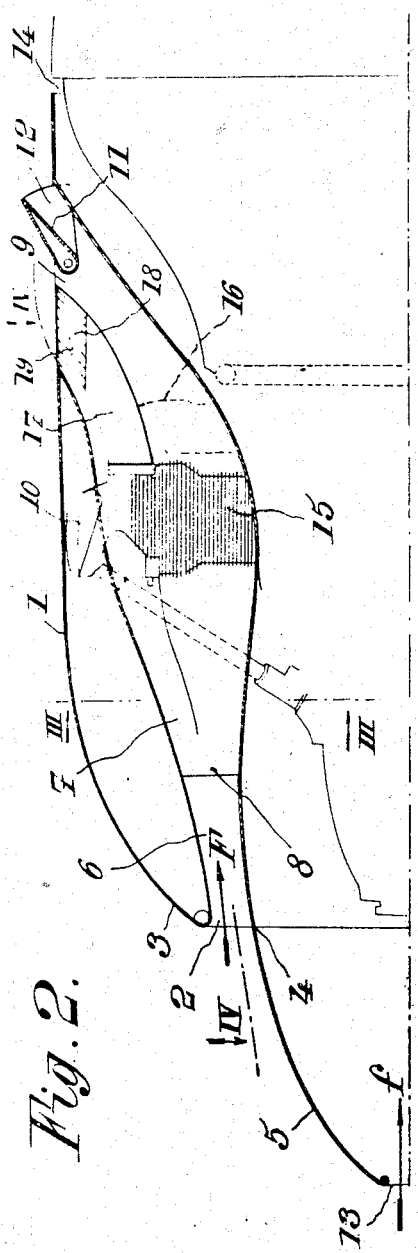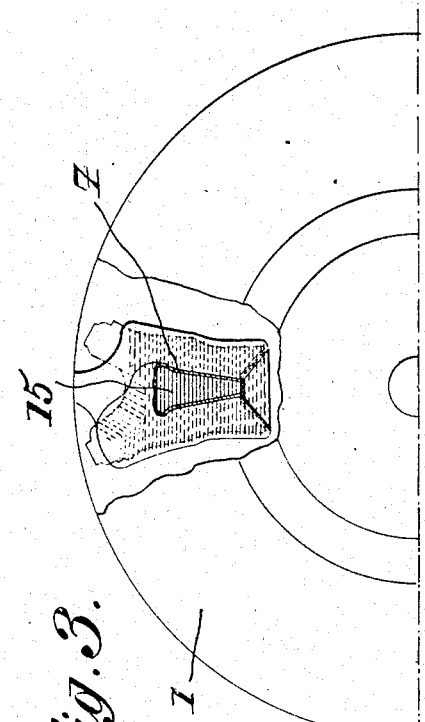

2,244,594

UNITED STATES PATENT OFFICE 2,244,594

DIRECT AIR COOLED ENGINE

Felix Amiot, Neuilly-sur-Seine, France

Application January 31, 1939, Serial No. 253,925
In Luxemburg March 10, 1938

3 Claims. (Cl. 123—171)

The present invention relates to direct air cooled engines and it is more especially, although not exclusively, concerned with engines of this kind mounted on aircraft.

The object of the present invention is to provide an engine of this kind which is better adapted to meet the requirements of practice than engines of the same kind as made up to the present time, and, in particular, in which the cooling is more uniform and the head resistance is reduced, owing to an improved circulation of air along the parts to be cooled.

According to the essential feature of the present invention, the cooling system of the engine is arranged in such manner that air is caused to flow, by means of suitable conduits, exclusively along the surfaces to be cooled, preferably separately for each element of the engine.

According to another feature of the present invention, the cooling system of the engine includes an air inlet main from which the separate conduits, above referred to, start.

According to still another feature of the present invention, in order to guide the cooling air around each cylinder or group of cylinders of the engine, I arrange these guiding means in such manner that the cooling air, before passing on the surfaces to be cooled, is first caused to flow through a throttled passage forming a venturi, a similar throttled passage being preferably provided at the rear.

According to still another feature of the present invention, in cooling systems for internal combustion engines in which cooling air is guided by suitable conduits between the cylinders and the external wall of the cowling, the exhaust tubes of the engine pass inside said conduits, where they are subjected to the action of the cooling air streams flowing through said conduits.

It has already been suggested, in engines of this kind, in order to ensure the circulation of air around the respective elements or cylinders of the engine, to provide systems of iron sheets or deflector conduits, which received air from the front of the cowling, preferably through inlet ports, either combined or not with adjustment shutters. But it was found that, with such an arrangement, it is impossible to obtain a uniform cooling. Under certain flying conditions, and in particular when flying with a great angle of attack, especially when taking off (when, as a matter of fact, the cooling effect should be maximum since the power to be supplied must also be maximum) the dynamic pressures at the inlets of the various conduits leading to the cylinders may be very different, respectively, so that some cylinders are better cooled than others.

Furthermore, the circulation of air on the inside of the engine cowling, according to the arrangements existing at the present time, takes place under conditions such that air is caused to strike many elements which do not need any cooling, and which constitute as many obstacles producing an increase of the head resistance.

The object of the present invention is to obviate these drawbacks and, according to the essential feature of said invention, the cooling air is caused to flow along a path such (for instance through suitable conduits) that it strikes exclusively the surfaces to be cooled, and has no action whatever on parts such as inlet tubes, rocker arms, boxes for the valves, and so on.

In order to obtain this result, according to the present invention, I make use, preferably, of a plurality of conduits arranged in such manner that they receive air at the front of the cowling and convey said air around the parts to be cooled, after which said air is caused to escape through suitable apertures toward the rear.

According to a particularly advantageous arrangement, these various conduits all branch off from a main arranged in such manner and connected in such manner with said conduits that a substantially uniform pressure exists in said main, whatever be the angle of attack of the airplane.

These features are, for instance, carried out as it will be hereinafter described with reference to the drawings.

Other features of the present invention will result from the following detailed description of some specific embodiments thereof.

Preferred embodiments of the present invention will be hereinafter described, with reference to the accompanying drawings, given merely by way of example, and in which:

Fig. 1 is a vertical elevational view of a double bank air cooled engine provided with a cowling and a cooling system, made according to an embodiment of the invention;

Fig. 2 is an axial half-section of the structure of Fig. 1;

Fig. 3 is a sectional view on the line III—III of Fig. 2; and

Fig. 4 is a sectional view on the line IV—IV of Fig. 2.

In the following description, it will be assumed that the invention is applied to the cooling system of an airplane engine of the air-cooled type to be mounted inside a cowling, with a view to improving the cooling and reducing the head resistance.

Concerning first the cowling proper 1, it is preferably made as described in my co-pending application Serial No. 253,924 filed Jan. 31, 1939. In such an arrangement, said cowling is made of streamlined axial section, shown by line AMB, corresponding, at least approximately, to the airfoil section of minimum head resistance. Means are provided at the front for the inflow of the air serving to the cooling of the engine, said means consisting for instance in providing, on the inside of the theoretical profile AMB, an annular aperture 2 between the front edge 3 of the cowling, which is especially shaped for this purpose and the rear edge 4 of an element 5, which may be constituted by a nose mounted on the propeller hub.

Preferably, the diameters L and l of this annular inlet will be, respectively, smaller than 60 per cent of the diameter of the portion of the cowling where the cross section is of maximum area and greater than 45 per cent of this diameter.

Concerning now the means for circulating air through this annular (or other) opening, they include the inlet main above referred to, and which, in the particularly simple arrangement disclosed by the drawings, is located at 6, immediately behind the annular inlet space 2.

Furthermore, in order to produce a rise of pressure in main 6, and therefore to render said pressure more uniform over the whole periphery of said main, the various respective conduits 7 are fed from said main through throttled passage 8 forming venturis.

The air conveying conduits are arranged in such manner as to produce a correct cooling of the cylinders and especially the cylinder heads.

These air conveying conduits finally open either into an outlet main or directly into the atmosphere, independently from one another, through corresponding exhaust orifices, such as 9, the outflow taking place preferably in, or close to, the transverse plane corresponding to the maximum area of the cross section of the cowling, according to a feature of the above mentioned co-pending application.

Conduits 7 are made by means of metal sheet elements corresponding to the shapes and arrangements of the cylinders which, in the example illustrated, form two parallel banks. The section of these conduits by a longitudinal plane includes a widened portion located behind the throttled passage. This section is such that it ensures a particularly good cooling on the side of the cylinder heads, where the heat is maximum. Preferably, the transverse section will be of triangular shape, as shown by Fig. 3.

In any case, the effect will be such that only the surfaces to be cooled are subjected to the action of the cooling streams of air. For instance the valve boxes 10 will remain accessible, being located outside of conduits 7. The same is true of the control rods, the rocker arms, the inlet tubes 16 and so on.

On the side of the escape, the section of each conduit will preferably be again throttled.

According to another feature of the present invention, which can be used separately, the exhaust tubes 17 pass on the inside of the above mentioned conduits. Thus, said exhaust tubes open to the inside, after having been already cooled, along their path, by the air streams circulating through conduits 7.

These exhaust tubes 17 may be provided, at their ends with silencers 18 which can be provided, as other portions of said tubes are similarly provided with cooling fins 19.

Finally, the whole is fitted with any adjustment means, such for instance as shutters 11 combined with outlet orifices 9.

When the exhaust tubes are mounted as above described, the outlet orifices 9 may be provided, on the one hand, with a first annular part, which is constantly open and surrounds the tubes or silencers 17, 18, and, on the other hand, another part, in particular at the rear, which is adapted to coact with said shutters 11.

In the drawings, these shutters are made as described in the above mentioned co-pending application, being arranged in such manner as to produce, in their opened position, and under the action of the relative wind, a suction which tends to accelerate circulation, or an increase of suction when there is already a suction in the transverse plane corresponding to the portion of maximum cross section of the cowling as a consequence of the streamlined shape of said cowling.

These shutters are preferably U-shaped, with lateral wings 12.

Of course, the system may be further completed by means for cooling the other parts of the engine, if necessary, and in particular the crankcase thereof. Said means may for instance consist of a second circulation through, for instance, an axial aperture 13 provided in the central nose 5. This second circulation is indicated, on the drawings, by reference character f, the corresponding escape orifices being shown at 14, while the main cooling circuit is indicated by arrows F.

In any case, whatever be the embodiment that is chosen, I obtain a system the working of which results sufficiently clearly from the preceding description for making it necessary to enter into further explanations.

With this device, only the surfaces to be cooled are subjected to the action of the cooling air. As no obstacle in addition to these surfaces opposes said circulation, it follows that, for the same cooling effect, the head resistance or drag is considerably reduced, Furthermore, owing, in particular, to main 6, a cooling of the same intensity for all the cylinders is obtained.

Finally, this system permits of easily reaching the various elements of the engine, since cowling 1 is of course provided with opening parts.

As above stated, I might provide, at the outlet ends of conduits 7, a main adapted to play a part analogous to that of main 6, and even capable of replacing it.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A structure of the type described for use with an air-cooled engine, comprising, in combination, a cowling adapted to surround said engine, means in said cowling forming a forward equalization chamber, and means forming individual air conduits in communication with said equalization chamber and adapted to guide air past at least a portion of each of the cylinders of said engine, respectively, said individual air conduits communicating at their rear ends with the atmosphere, and individual exhaust conduits for each of said cylinders, the individual exhaust conduits being disposed, respectively, in the interior of said air conduits.

2. A structure of the type described for use with an air-cooled engine, comprising, in combination, a cowling adapted to surround said engine, means in said cowling forming a forward equalization chamber, and means forming individual air conduits in communication with said equalization chamber and adapted to guide air past at least a portion of each of the cylinders of said engine, respectively, said individual air conduits communicating at their rear ends with the atmosphere, individual exhaust conduits for each of said cylinders, the individual exhaust conduits being disposed, respectively, in the interior of said air conduits, each of said air conduits having at their rear ends a fixed opening, an opening of variable section, and a regulating valve in said last-mentioned opening.

3. A structure of the type described for use with an air-cooled engine, comprising, in combination, a cowling adapted to surround said engine, means in said cowling forming a forward equalization chamber, and means forming individual air conduits in communication with said equalization chamber and adapted to guide air past at least a portion of each of the cylinders of said engine, respectively, said individual air conduits communicating at their rear ends with the atmosphere, individual exhaust conduits for each of said cylinders, said conduits being disposed, respectively, in the interior of said air conduits and having their rear ends terminating substantially at the ends of said air conduits at one side thereof, each of said air conduits having at the rear end a fixed opening adjacent the exhaust conduit therein, an opening of variable section, and a regulating valve in said last-mentioned opening.

FELIX AMIOT.